United States Patent [19]

Chen

[11] Patent Number: 4,957,519
[45] Date of Patent: Sep. 18, 1990

[54] AIR-CLEANING APPARATUS

[76] Inventor: Chi-Shiang Chen, No. 15, Chung-Shan Rd., Su-Ao Chen, Ilan Hsien, Taiwan

[21] Appl. No.: 372,438

[22] Filed: Jun. 26, 1989

[30] Foreign Application Priority Data

May 4, 1989 [TW] Taiwan .............................. 78103433

[51] Int. Cl.⁵ ............................................. B01D 47/00
[52] U.S. Cl. ....................................... 55/233; 55/240
[58] Field of Search ................... 55/73, 90, 94, 233, 55/241, 240, 259

[56] References Cited

U.S. PATENT DOCUMENTS

| | | | |
|---|---|---|---|
| 2,947,383 | 8/1960 | Schytil et al. | 55/90 |
| 3,370,402 | 2/1968 | Nakai et al. | 55/94 |
| 3,672,126 | 6/1972 | Goettle | 55/233 X |
| 3,748,828 | 7/1973 | Lefebvre | 55/233 X |
| 3,795,089 | 3/1974 | Reither | 55/233 X |
| 3,907,523 | 9/1975 | Melin | 55/94 X |

Primary Examiner—Bernard Nozick
Attorney, Agent, or Firm—Harness, Dickey & Pierce

[57] ABSTRACT

The disclosure herein describes an air-cleaning apparatus which comprises a frame support in the form of a rectangular hollow body including a first lateral wall having an inlet adapted for receiving exhaust and a second lateral wall opposite to the first lateral wall having an outlet for expelling cleaned exhaust; at least one filtering member removably inserted between the first and second lateral walls, which has a plurality of suitably dimensioned perforations formed therein, means for supplying a cleaning liquid, said means enabling said cleaning liquid to flow against said filtering member and spread over said perforations; and means for collecting said cleaning liquid. When a stream of the cleaning liquid is spread over the filtering member, a liquid film is effectively formed on the perforations therein, which will efficiently remove any pollutants existing in the exhaust so as to prevent air pollution from resulting therefrom.

7 Claims, 6 Drawing Sheets

4,957,519

AIR-CLEANING APPARATUS

BACKGROUND OF THE INVENTION

The present invention pertains to an air-cleaning apparatus and particularly, to an apparatus for installation in an exhaust pipe so as to remove undesired particles and gases from the exhaust discharged from said exhaust pipe.

As people become more environment-conscious, the elimination of harmful dust and gases from the exhausts of factories and machines becomes increasingly important in order to control air pollution in many developed countries. Generally, the major source of air pollution is the industrial exhaust discharged from the chimney stacks of factories. The discharged exhaust usually contains a large amount of dust and gases capable of destroying the natural atmospheric balance and damaging human health. In order to render such exhaust free from any pollutants, a kind of air-cleaning apparatus has been developed, the construction of which is shown in FIG. 1. The prior art apparatus primarily comprises a tank 11 for removing dust and a tank 12 for removing the harmful gases. The operation of this apparatus is carried out as follows: the stack exhaust enters into the tank 11 through an inlet pipe 13 and is sprayed by a water spraying device 14 installed therein whereby the dust is removed by the absorption of the falling water droplets; the remaining exhaust then enters into the tank 12 through a channel 15 and is sprayed by a mixture spraying device 16 installed therein, the sprayed mixture being directed to a chemical composite existing in the exhaust, e.g., the limewater (calcium carbonate), which is capable of reacting with and eliminating a harmful gaseous sulfide present in the exhaust, while the by-product, e.g., $CaSO_4$ can be recovered as a raw material for use in the production of plaster of Paris. The cleaned exhaust is then discharged through an outlet pipe 17 into the atmosphere.

However, in view of the fact that the downward spreading droplets of water and the chemical mixture cannot contact all of the stack exhaust, it is difficult to entirely remove the dust and the harmful gases from said exhaust by the means of this apparatus. Moreover, during the cleaning and/or the maintenance of the apparatus of this invention, the operation thereof must be interrupted.

Accordingly, it is an objective of the present invention to provide an air-cleaning apparatus which can effectively remove all of the pollutants existing in the factory or machine exhaust.

Another objective of the present invention is to provide an air-cleaning apparatus which can operate continuously while performing cleaning or maintenance procedures thereon.

SUMMARY OF THE INVENTION

According to the present invention, there is provided an air-cleaning apparatus for installation in an exhaust pipe to effectively remove the dust and the harmful gases contained in the exhaust discharged therefrom so as to prevent air pollution.

The present apparatus substantially comprises a frame support which includes a first lateral wall having an inlet adapted for receiving the exhaust and a second lateral wall having an outlet for expelling the cleaned exhaust; at least one filtering member removably inserted between the first and second lateral walls, which has a plurality of suitably dimentioned perforations formed therein, means for supplying a selected cleaning liquid and allowing said cleaning fluid to flow against the filtering member and spread over the perforations thereof, whereby a liquid film is effectively formed thereon after the cleaning liquid flows over said filtering member; and means for collecting said cleaning liquid flowing over said filtering member.

Preferably, the filtering member comprises a hollow filter frame and a filter membrane with suitably dimensioned perforations formed therein. More preferably, the filter membrane is composed of a plurality of membrane layers.

Preferably, the supplying means comprises at least one first supplying member for feeding water to the filtering member. More preferably, the supplying means comprises at least one second supplying member for feeding a selected chemical solution to the filtering member, said chemical solution being capable of reacting with a harmful gas existing in the exhaust so as to eliminate the risk of environmental pollution resulting therefrom.

Moreover, the exhaust pipe, according to the actual needs thereof, can be provided with a plurality of apparatuses of the present invention, each of which is directed to an individual pollutant present in the exhaust, so as to maximize the cleaning efficacy thereof.

Features and advantages of the present invention will become apparent from the following detailed description with reference to the accompanying drawings, in which:

DETAILED DESCRIPTION OF THE INVENTION

Figure 1:
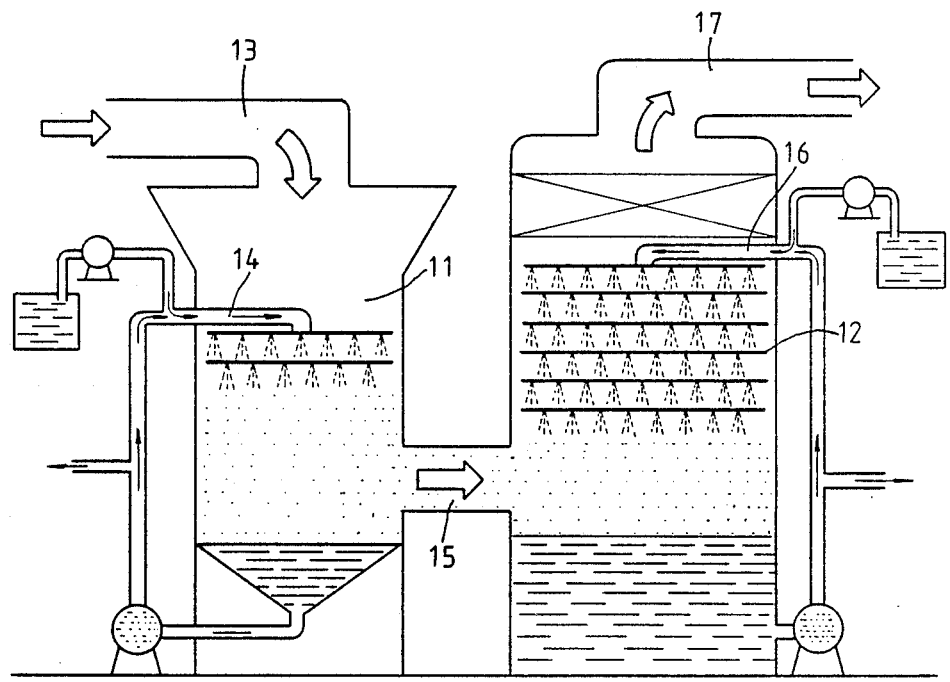
FIG. 1 is a schematic view illustrating the cleaning process of a prior air-cleaning apparatus.
Figure 2:
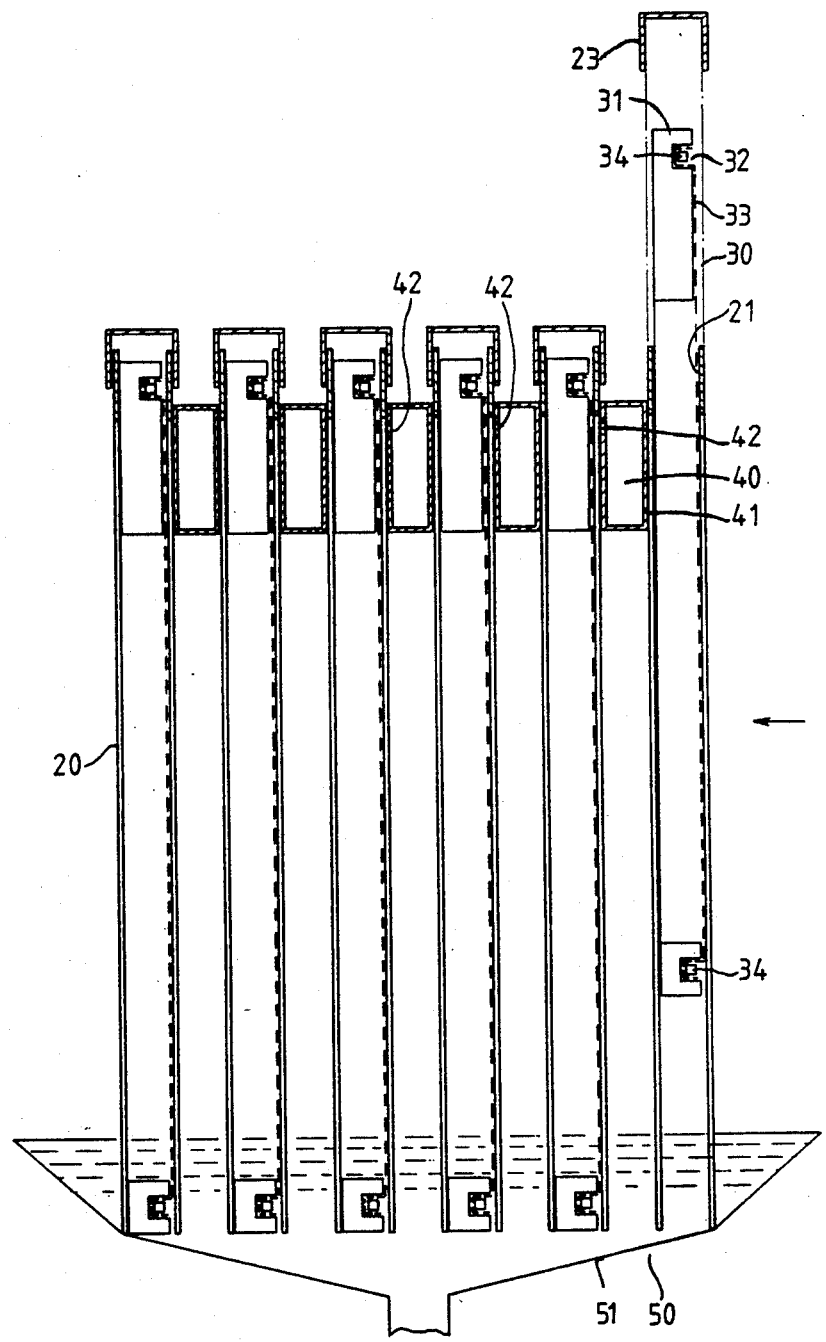
FIG. 2 is a schematic view showing the construction of a preferred embodiment in accordance with the present invention.
Figure 3:
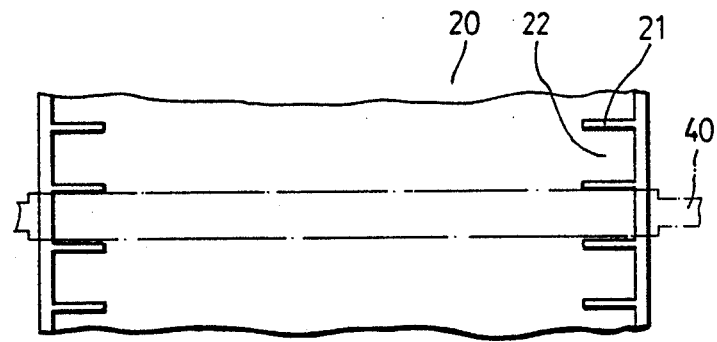
FIG. 3 is a schematic top view of the preferred embodiment shown in FIG. 2.

Referring to FIGS. 2 and 3, a preferred air-cleaning apparatus of the present invention is shown, which substantially comprises a frame support 20, a plurality of filtering members 30, liquid supplying means 40 and liquid collecting means 50.

The frame support 20 is substantially in the form of a rectangular hollow body, comprising a first lateral wall having an inlet adapted for receiving the exhaust and a second lateral wall opposite to the first lateral wall for expelling the cleaned exhaust. The rectangular hollow body further comprises two opposite lateral walls located parallel to the direction of the flow of the exhaust, each of which have a plurality of longitudinal ribs 21 disposed in the inner surface thereof. The filtering member 30 is removably inserted between the opposite grooves 22 defined by the corresponding, opposite longitudinal ribs 21 and oriented in a direction transverse to the flow of the exhaust. The frame support further comprises a plurality of top caps 23 for covering the tops of the filtering members 30 interposed therein.

The filtering member 30 comprises a rectangular hollow filter frame 31 adapted to be interposed between the opposite grooves 22 and a filter membrane 33 with suitably dimensioned perforations formed thereon. The filter frame 31 is provided with recesses 32 and frame rods 34 so as to secure the filter membrane 33 thereon. Preferably, the filter membrane 33 is composed of a plurality of membrane layers.

The liquid supplying means 40 is disposed on top of the frame support 20 and alternately arranged with the filtering member 30, comprising a supply tube 41 having a row of spraying orifices 42 facing said filtering member 30.

The liquid collecting means 50 is disposed at the bottom of the frame support 20, comprising a collecting tray 51 to collect the cleaning solution which is sprayed by the liquid supplying means 40 and flows over the filter membrane 33. In addition, the bottoms of the frame support 20 and the filtering member 30 are immersed in the liquid retained in the collecting tray 51.

Figure 4A:
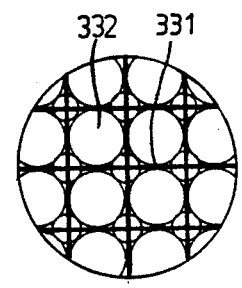
FIG. 4A shows a liquid tension film formed on a portion of the perforations provided in the filtering member of the preferred embodiment shown in FIG. 2.

In operating the embodiment of FIG. 2, the liquid supplying means 40 forces a stream of a selected cleaning solution through the spraying orifices 42 and against the filtering member 30, said cleaning solution then spreading over the perforations of the filter membrane 33. A filtering liquid film, attributable to the liquid tension, is then effectively formed on the filter membrane 33, as shown in FIG. 4A. The liquid film will block and absorb dust and/or the harmful gases existing in the exhaust passing therethrough and the falling droplets carrying the absorbed pollutants will be collected in the collecting tray 51. The advance of the exhaust flow can be efficiently enhanced by installing an air compressor in the air-cleaning system of this invention. Finally, the cleaned exhaust can be discharged into the atmosphere.

The cleaning solution to be spread over the filter membrane can merely comprise water for adsorbing dust, or a chemical solution capable of reacting with a harmful gas contained in the discharged exhaust so as to eliminate the risk of air pollution resulting therefrom. For example, the cleaning solution can be comprised of limewater which is capable of removing a harmful gaseous sulfide such as $SO_2$. The resultant $CaSO_4$ collected in the collecting tray 51 can be recovered as a raw material for use in the production of plaster of Paris.

Figure 4:
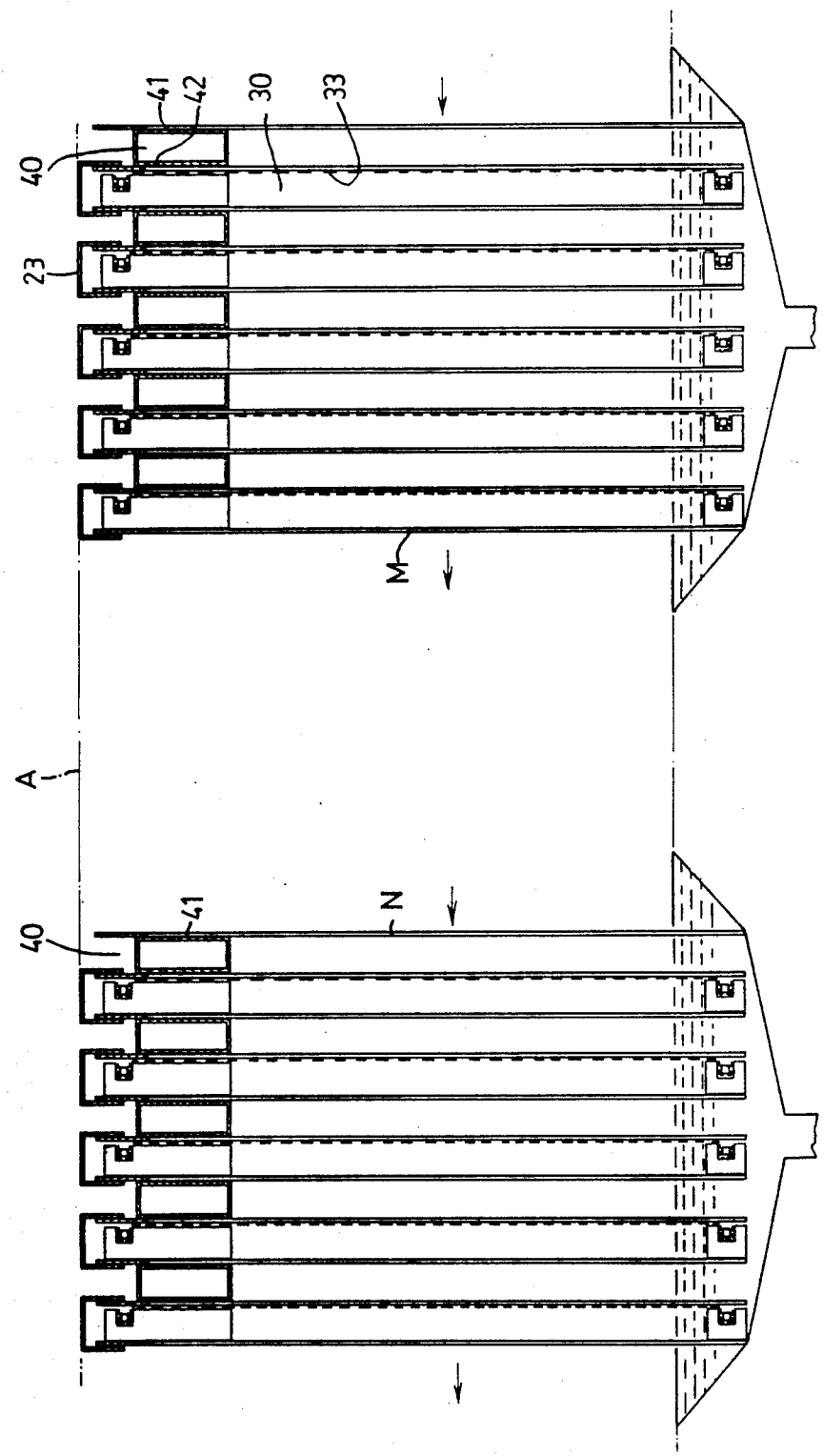
FIG. 4 is a schematic view showing an air-cleaning system having two units of the embodiments shown in FIG. 2 connected to an exhaust pipe.

In FIG. 4, which shows an air cleaning system having two units of the preferred embodiment of FIG. 2 connected to an an exhaust pipe, it is revealed that the first unit can be adapted for removing dust only. In this adaption of the invention, the cleaning solution to be spread over the filter membrane 33 is water. The second unit can be adapted for removing a harmful gas such as $SO_2$ and the cleaning solution to be spread can be a corresponding chemical solution such as limewater.

The system described above is merely a simple example illustrating that the air-cleaning system, according to the actual needs of the user, may comprise at least two units of the embodiment of FIG. 2, each of which is directed to an individual pollutant to be removed from the factory or machine exhaust.

The filter membrane 33 can be cleaned merely by means of the continuous flowing of the cleaning solution thereover. Regarding the overall cleaning of the system of this invention, the individual filtering members 30 can be separately removed from the frame support 20 for washing by opening the top cap 23 and washed. Since each of the filtering members 30 of the system of this invention is independent, the normal operation of the apparatus thereof need not be interrupted during the cleaning, or the maintenance, thereof. Alternatively, the present apparatus can be coupled with an agitating device so that the cleaning of the filtering member 30 may be achieved by agitation.

Figure 5:
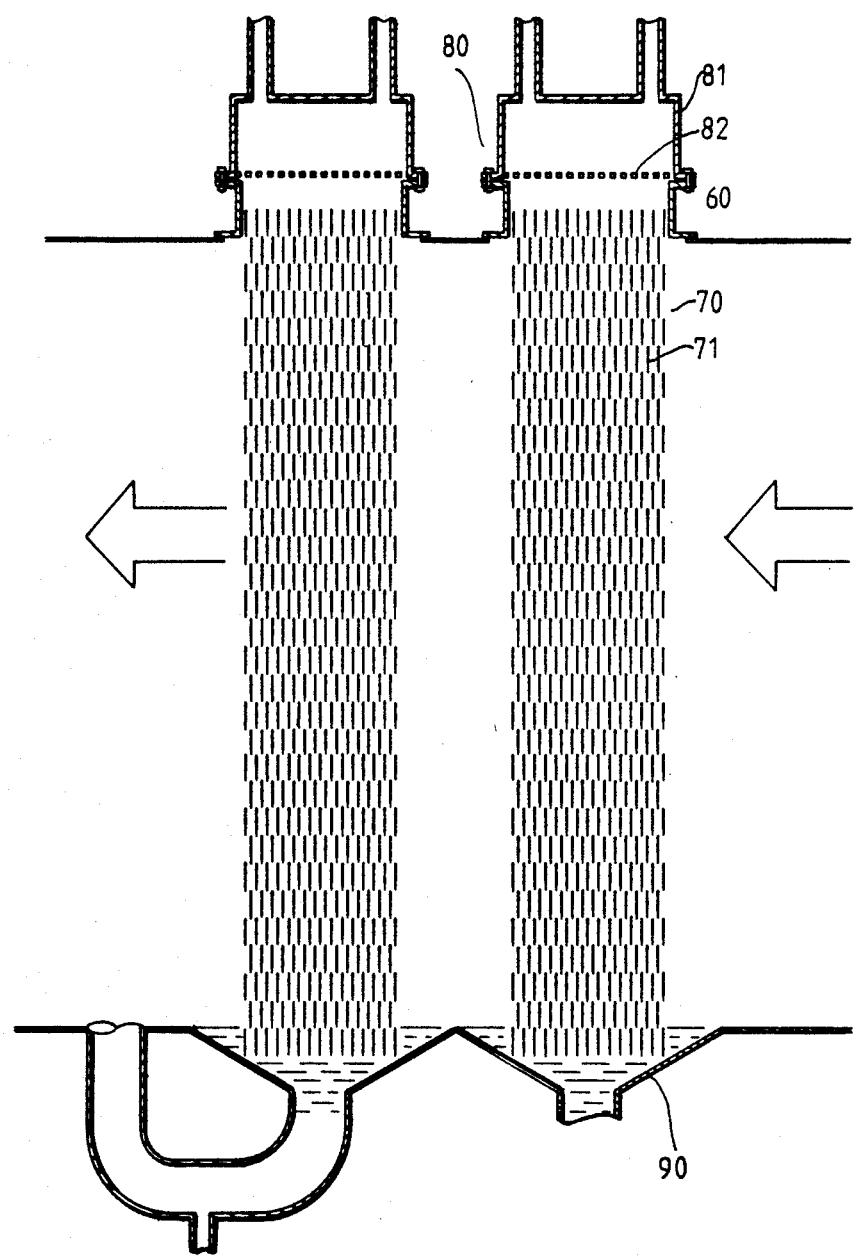
FIG. 5 is a schematic side view showing a second embodiment in accordance with the present invention.
Figure 6:
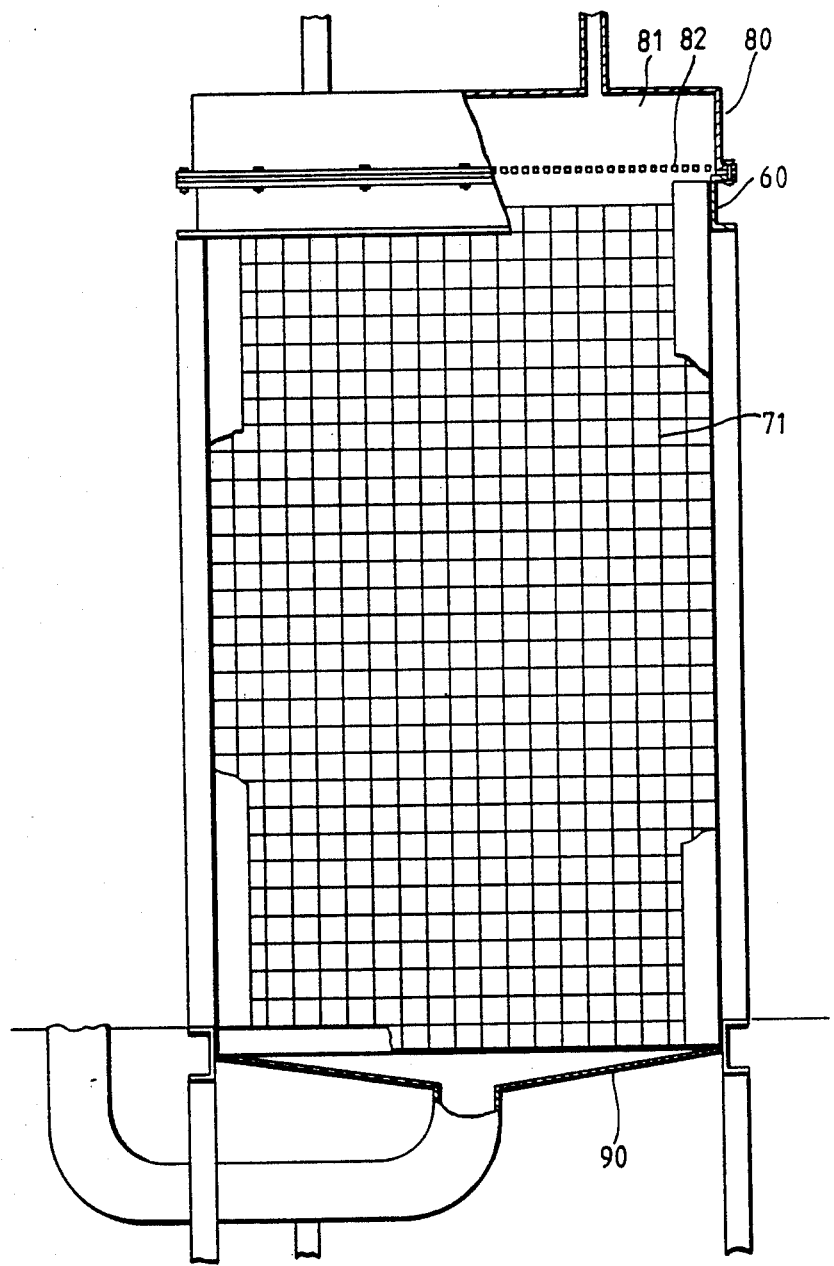
FIG. 6 is a schematic front view of the second embodiment shown in FIG. 5.

The number of the filtering members 30 and the layers of the filter membrane 33 are variable, depending upon the actual needs of the user. Moreover, the surface area of the filtering membrane 33 is extendable. A second embodiment of the present invention is shown in FIGS. 5 and 6, which comprises at least one frame support 60, a plurality of filter membranes 70 including a plurality of membrane layers 71, a liquid supplying means 80 comprising a supply tube 81 having numerous spraying orifices 82 facing the membrane layers 71, and a liquid collecting means 90.

With the invention thus explained, it is apparent that various modifications and variations can be made without departing from the scope of the invention. It is therefore intended that the invention be limited only as indicated in the appended claims.

I claim:

1. An apparatus for removing undesired particles or gases from an exhaust discharged from an exhaust pipe, comprising:
   a frame support including a first lateral wall having an inlet adapted for receiving said exhaust, and a second lateral wall opposite to said first lateral wall having an outlet for expelling said exhaust;
   a plurality of filtering members each being removably inserted between said first and second lateral walls, each filtering member comprising a hollow peripheral frame having a filter membrane secured thereto, said membrane having a plurality of perforations formed thereon;
   said frame support including means for supporting each of said filtering members in substantially parallel spaced relationship whereby each of said filtering members may be removed from said frame support independently of the others of said filtering members;
   means for supplying a stream of a cleaning liquid and allowing said stream of cleaning liquid to flow against said filtering member and spread over a major portion of said perforations;
   wherein said perforations are dimensioned such that a liquid film is effectively formed thereon after said cleaning liquid flows over said filtering member; and
   means for collecting said cleaning liquid flowing over said filtering member.

2. An apparatus according to claim 1 wherein said filtering member is oriented in a direction perpendicular to the flowing direction of said exhaust.

3. An apparatus according to claim 1 wherein said supplying means comprises at least one first supplying member for feeding water to said filtering member.

4. An apparatus according to claim 3 wherein said supplying means comprises at least one second supplying member for feeding a chemical solution to said filtering member, said chemical solution being capable of eliminating the danger of environmental pollutions caused by the presence of harmful gases in said exhaust.

5. An apparatus according to claim 3 wherein said chemical solution is capable of absorbing said harmful gases.

6. An apparatus according to claim 1 wherein said filtering member comprises a hollow filter frame and a filter membrane formed thereon for accommodating said perforations.

7. An apparatus according to claim 5 wherein said filter membrane is in the form of a plurality of membrane layers.

* * * * *

UNITED STATES PATENT AND TRADEMARK OFFICE
CERTIFICATE OF CORRECTION

PATENT NO. : 4,957,519

DATED : September 18, 1990

INVENTOR(S) : Chi-Shiang Chen

It is certified that error appears in the above-identified patent and that said Letters Patent is hereby corrected as shown below:

ON THE TITLE PAGE,
Delete the heading and information:
"Foreign Application Priority Data"
"May 4, 1989 [TW] Taiwan ....... 78103433"

Column 1, lines 53-54, "continously" should be --continuously--.

Column 2, line 1, "dimentioned" should be --dimensioned--.

Column 3, line 56 (second occurrence), delete "an".

Column 5, line 4, Claim 5, "3" should be --4--.

Column 6, line 4, Claim 7, "5" should be --6--.

Signed and Sealed this

Seventh Day of April, 1992

Attest:

HARRY F. MANBECK, JR.

*Attesting Officer*     *Commissioner of Patents and Trademarks*